(12) United States Patent
Chiang

(10) Patent No.: US 7,251,280 B2
(45) Date of Patent: Jul. 31, 2007

(54) CIRCUIT STRUCTURE AND SIGNAL ENCODING METHOD FOR A SERIAL ATA EXTERNAL PHYSICAL LAYER

(75) Inventor: Chinyi Chiang, Taipei (TW)

(73) Assignee: Via Technologies Inc., Taipei (TW)

( * ) Notice: Subject to any disclaimer, the term of this patent is extended or adjusted under 35 U.S.C. 154(b) by 781 days.

(21) Appl. No.: 10/626,587

(22) Filed: Jul. 25, 2003

(65) Prior Publication Data
US 2004/0153683 A1    Aug. 5, 2004

(30) Foreign Application Priority Data
Mar. 13, 2003    (TW)    .............................. 92105414 U

(51) Int. Cl.
H04B 14/04     (2006.01)
H04B 1/38      (2006.01)
H04B 3/00      (2006.01)
G06F 5/00      (2006.01)

(52) U.S. Cl. ...................... 375/242; 375/219; 375/257; 710/51

(58) Field of Classification Search ................ 375/219, 375/222, 241, 242, 257; 341/143; 710/33, 710/38, 51, 52; 714/748, 749
See application file for complete search history.

(56) References Cited

U.S. PATENT DOCUMENTS

| | | | | |
|---|---|---|---|---|
| 5,812,594 | A  * | 9/1998 | Rakib | ......................... 375/219 |
| 6,976,201 | B2 * | 12/2005 | Shin et al. | .................. 714/748 |
| 7,020,834 | B2 * | 3/2006 | Chiang et al. | .............. 714/799 |
| 2004/0135614 | A1 * | 7/2004 | Xiao et al. | ................... 327/291 |

* cited by examiner

*Primary Examiner*—Young T. Tse
(74) *Attorney, Agent, or Firm*—Rosenberg, Klein & Lee

(57) ABSTRACT

A circuit structure and signal encoding method for a serial ATA external physical layer is provided. The circuit structure and signal encoding method thereof is capable of reducing the number of interface signals of a serial ATA external physical layer, essentially comprising a decoder/encoder, a serializer/deserializer, a phase locked loop, at least one transmitter, at least one receiver, and at least one OOB signal detector, encoding various control signals and various status signals, required for the connection between the decoder/encoder and a storage medium controller, into data signals using signals other than a data conversion requirement of 8 bits and 10 bits, by the decoder/encoder, in order for greatly reducing the number of interface signals required for the connection between the external physical layer and a main control chip.

13 Claims, 4 Drawing Sheets

| Ex1 | 0 | 0 | 0 | 0 | 0 | 0 | a | b | c | d |

| Ex2 | a | b | c | d | 1 | 1 | 1 | 1 | 1 | 1 |

| Ex3 | a | b | 0 | 0 | 0 | 0 | 0 | 0 | c | d |

FIG. 4

CIRCUIT STRUCTURE AND SIGNAL ENCODING METHOD FOR A SERIAL ATA EXTERNAL PHYSICAL LAYER

FIELD OF THE INVENTION

The present invention relates to a circuit structure and signal encoding method for a serial ATA external physical layer, particularly to a circuit structure and signal encoding method thereof capable of reducing the number of interface signals of a serial ATA external physical layer.

BACKGROUND

In these days, as the high development in the information related industry and the need for information products with high operation and transmission speed increasingly, the industries may be forced to devote themselves in developing various transmission interface requirements. In terms of the storage interface, from the ATA (Advanced Technology Attachment) interface with a transmission rate of 16 MBps in the early phase, through the ATA33 interface with a transmission rate of 33 MBps, and the ATA66 interface with a transmission rate of 66 MBps, until the ATA100 and ATA133 interface requirements, etc., all of them are confined by parallel data transmission, such that the amount of the signal lines used for transmission, the noise interference, the limitation on the length of the transmission lines, and the difficulty for raising the transmission rate are greater in the aforementioned interface requirements.

Recently, a serial ATA interface requirement is presented owing to several industries with unceasing attempts. Whereby, not only the transmission rate is raised beyond 1.5 GBps in the first generation at one stroke, but also the second generation with the transmission rate of 3 GBps and even the third generation with that of 6.0 GBps are all just around the corner. Moreover, the only four signal lines being required for data transmission, and the greatly lengthened signal lines, are all significant progress.

Moreover, the product with serial ATA interface requirement is still under developed, and that with parallel ATA is yet mainstream. For the purpose of expansion as well as adaptation both, the design in the computer system is essentially capable of supporting two interface requirements.

In the past, there is an attempt for adding a serial ATA physical layer (PHY) into the storage medium controller provided in the main control chip, by which a serial ATA device is connected. However, a larger area must be occupied by the serial ATA physical layer including a high frequency analog circuit, such that the area of the main control chip will excessively large and the yield rate thereof may be hard to control, when the serial ATA physical layer is intended to be integrated into the main control chip (for example, south bridge chip).

Another solution proposed by the industry is shown in FIG. 1, wherein a part of circuit in the serial ATA physical layer is made independently in a serial ATA external physical layer 161. A storage medium controller 121 in a main control chip 12 may be connected to a serial ATA device 16 (a serial ATA hard disk, for instance) via the serial ATA external physical layer 161, other than connected to a parallel ATA device 18 (a parallel ATA hard disk, for example) via an IDE bus 14(Integrated Drive Electronics).

Although the aforementioned problem may be solved by this configuration, the connection pins must be added on the main control chip 12 for connecting with the external physical layer, resulting in an increased cost. Additionally, the slot and the circuit of the main board are also required to be redesigned entirely, causing bothering the industry.

SUMMARY OF THE INVENTION

Thus, what is desired by users and intended to be solved by the present inventor for a long time is that proposing a novel solution, designing a simple and effective circuit structure of external physical layer capable of not only reducing the number of pins required for connection, but also achieving connection by an IDE bus without the need for a great modification on the main board, aiming at the disadvantages of aforementioned conventional circuit structure and the problems emerged when it is used. Actual experiences, in related research, development, and sale, in the information industry are the basis of the present inventor for the improvement. With several designs, studies, samples, and improvements, a circuit structure and signal encoding method for a serial ATA external physical layer is thus invented for solving above problems.

Accordingly, it is a primary object of the present invention to provide a circuit structure for a serial ATA external physical layer, essentially providing a decoder/encoder in the external physical layer for encoding various control signals and various status signals, required for the connection between a storage medium controller and the external physical layer, into data signals to be transmitted, in order for greatly reducing the number of pins required for connection.

It is a secondary object of the present invention to provide a signal encoding method for a serial ATA external physical layer, essentially encoding various control signals and various status signals into data signals to be transmitted by means of signals, other than conversion requirement of 8 bits and 10 bits, served as codes, in order for greatly reducing the number of interface signals required for transmission.

It is another object of the present invention to provide a circuit structure for a serial ATA external physical layer storing data signals temporarily in a buffer register, being beneficial to encode various signals into the data signals.

It is another object of the present invention to provide a signal encoding method for a serial ATA external physical layer, wherein six continuous bits with all 0's or six continuous bits with all 1's may be provided as an identification symbol for control signals and status signals.

For the purpose of achieving aforementioned objects, the present invention provides a circuit structure for a serial ATA external physical layer, essentially comprising a decoder/encoder connected to a storage medium controller via a set of parallel signal transmission lines and a set of parallel signal receiving lines for decoding a parallel transmission signal originated from the storage medium controller into a parallel transmission data signal and at least one control signals; a serializer/deserializer connected to the decoder/encoder for the conversion of the parallel transmission data signal into a serial transmission data signal; a phase locked loop connected to the decoder/encoder and the serializer/deserializer, respectively, for receiving the control signals originated form the decoder/encoder, as well as generating clock signals required for the operation of the physical layer and transmitting a reference clock signal to the storage medium controller; at least one transmitters, connected to the serializer/deserializer, each of the transmitters being used to transmit the serial transmission data signal to a serial ATA device connected thereto via a set of serial signal transmission lines; at least one receivers connected to the serializer/deserializer, each of the receivers being used to transmit a serial receiving data signal received from the serial ATA device connected thereto to the serializer/deserializer, and then the serial receiving data signal being converted into a parallel receiving data signal by the serializer/deserializer for transmitting the decoder/encoder; and at least one out of band (OOB) signal detectors connected to receiving signal lines of the corresponding receivers, respectively, for detecting the operation condition of the serial ATA device and transmitting at least one sets of detected status signals to the decoder/encoder, the parallel receiving data signal and the status signals then being encoded into a parallel receiving signal by the decoder/encoder and, afterward, transmitted to the storage medium controller via the set of parallel signal receiving lines, in order for reducing the number of interface signals required for transmission.

Additionally, the present invention further comprises a signal encoding method for a serial ATA external physical layer applying to data signal transmission between the serial ATA external physical layer and the storage medium controller, essentially providing signals, other than conversion requirement of 8 bits and 10 bits, as codes for various control signals and various status signals, in the 10-bit parallel signal during the data conversion process, in order for greatly reducing the number of interface signals required for transmission.

BRIEF DESCRIPTION OF DRAWINGS

FIG. 4 is a diagrammatical view of an encoding method according to a preferred embodiment of the present invention.

DETAILED DESCRIPTION

Figure 1:
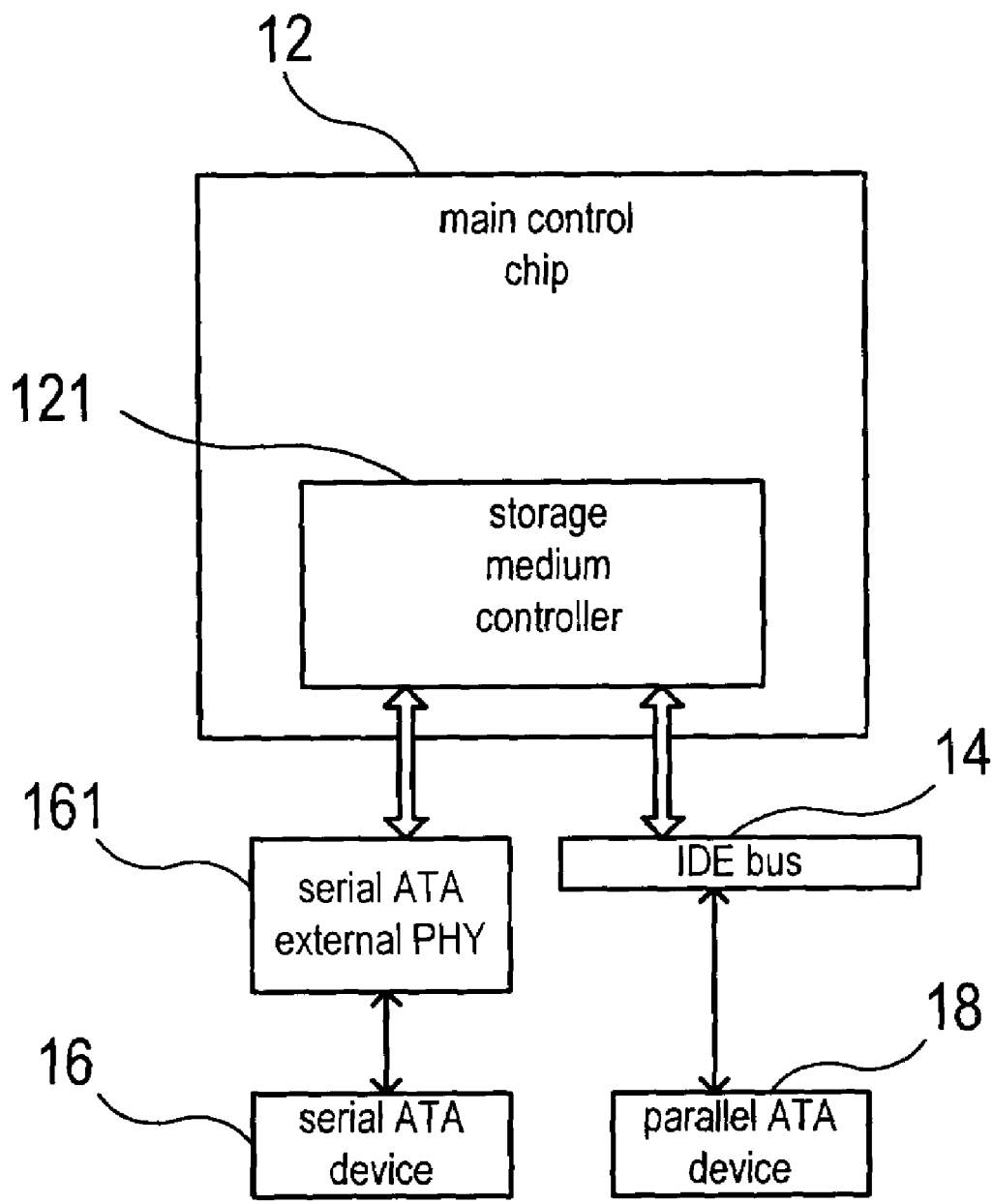
FIG. 1 is a block diagram of a conventional ATA interface configuration.
Figure 2:
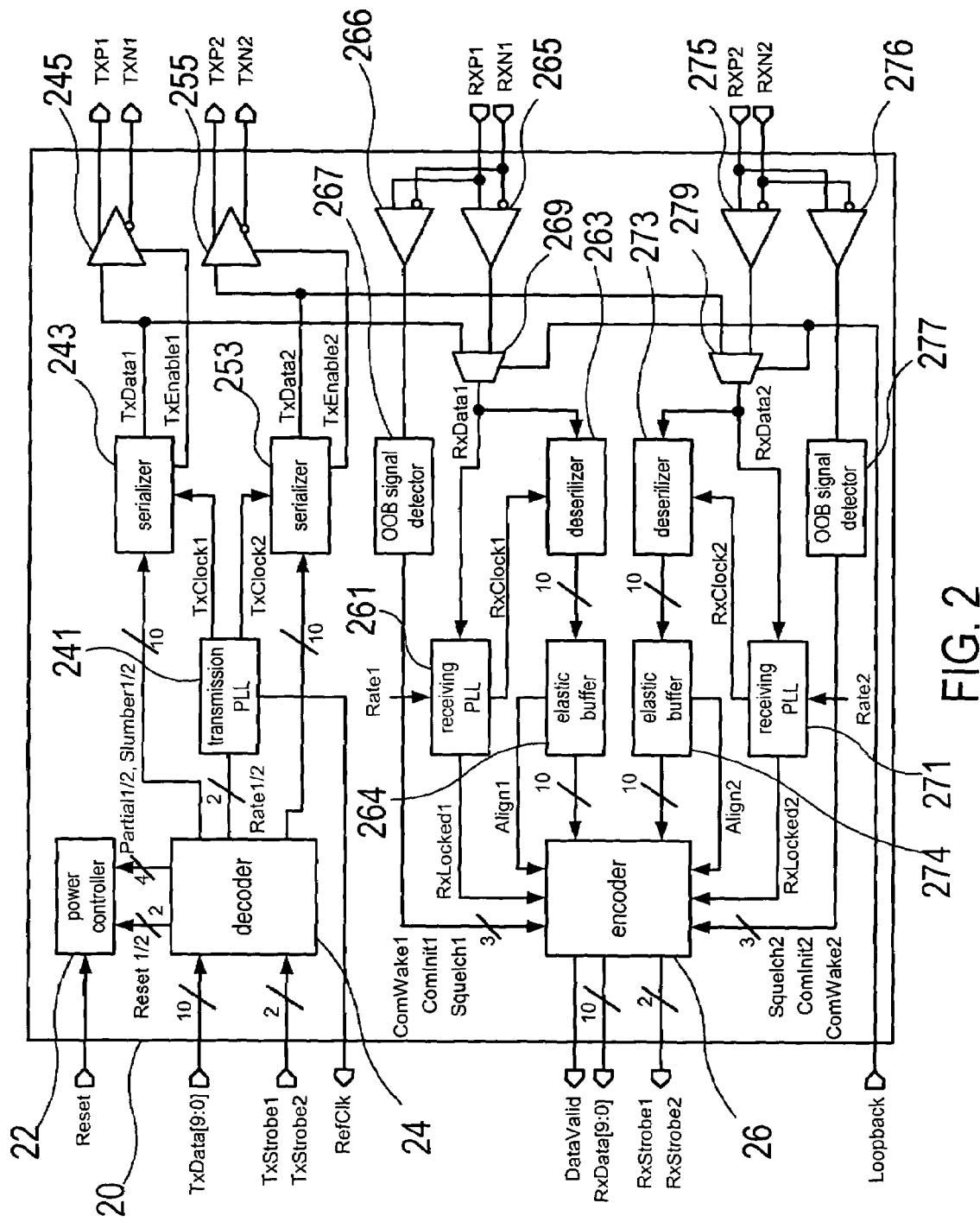
FIG. 2 is a circuit block diagram of an external physical layer according to a preferred embodiment of present invention.

The structural features and the effects to be achieved may further be understood and appreciated by reference to the following description of the presently preferred embodiments together with the accompanying drawings, in which:

Firstly, referring to FIG. 2, a circuit block diagram of an external PHY according to a preferred embodiment of present invention is shown. The main construction of the present invention may comprise: a decoder/encoder, at least one serializer/deserializer (SerDes), at least one phase locked loop (PLL), at least one transmitters, at least one receivers, and at least one OOB signal detectors.

In the designed elements of the serial ATA physical layer, one part included in the digital circuit comprising a 8 bits/10 bits encoder (8B10B encoder), a 10 bits/8 bits decoder (10B8B decoder), and a word alignment, etc., as examples, may be integrated into a storage medium controller; and the other part included in the analog circuit may be provided in a serial ATA external physical layer 20. Thus, an increased chip area on account of the high-frequency analog circuit integrated into the main control chip will not occur, maintaining the yield rate.

The design in the serial ATA external physical layer 20 may be varied depending on the actual demand. As illustrated in the figure, two sets of serial ATA devices may be included in the present invention and operated simultaneously.

The decoder/encoder comprises a decoder 24 and an encoder 26; the phase looked loop comprises a transmission phase locked loop 241 and two receiving phase locked loop 261, 271, corresponding to two sets of serial ATA devices, respectively; and serializer/deserilizer comprises two serializers (PISOs) 243, 253 and two deserilizers (SIPOs) 263, 273.

The transmission phase locked loop 241 generates clock signals TxClock1, TxClock2 and a reference clock signal (RefClk). Where the clock signals TxClock1 and TxClock2 are connected to the serializers 243, 253, respectively for the serial ATA external physical layer 20 to transmit signals. The reference clock signal (RefClk) is connected to a storage medium controller.

Parallel transmission signals originated from the storage medium controller may be received and then be decoded as parallel transmission data signals and at least one control signals, by means of the decoder 24 connected to the storage medium controller via a set of parallel signal transmission lines (TxData [9:0]). The parallel transmission data signals are transmitted to the corresponding serializers 243, 253, respectively, depending on the devices intended to be transmitted, and then converted into serial transmission data signals (TxData1, TxData2) by the serializers 243, 253. Subsequently, the converted serial transmission data signals being transmitted to the corresponding serial ATA devices via a set of serial signal transmission lines (TXP1, TXN2 or TXP2, TXN2) by means of transmitters 245, 255.

The control signals comprise reset signals (Reset1, Reset2), power control signals (Partial1, Partial2, Slumber1, and Slumber2), transmission valid signals (TxValid), and transmission rate selection signals (Rate1, Rate2). In which, it could be assumed that the storage medium controller have begun to transmit the data signal, as the transmission valid signals have been obtained from the decoder 24. The reset signals and power control signals are transmitted to a power controller 22 by which the power may be controlled integratedly. The transmission rate selection signals are connected to the transmission phase locked loop 241 and the receiving phase locked loop 261, 271, respectively, in order to switch the clock signals used for different transmission rates.

In connection with the receiving part, serial receiving data signals (RxData1, RxData2) originated from the serial ATA devices are received by receivers 265, 275 via a set of serial signal receiving lines (RXP1, RXN1 or RXP2, RXN2), and then transmitted to deserializers 263, 273. With the deserilizers 263, 273, the serial receiving signals are converted into parallel receiving data signals depending on clock signals RxClock1, RxClock2 generated by the receiving phase looked loop 261, 271, and then stored into elastic buffers 264, 274 for the moment.

Out of band (OOB) signal detectors 267, 277, connected to the respective serial signals receiving lines, may be used for detecting the status of signal transmission, in order to obtain status signals, such as receiving squelch signals (Squelch1, Squelch2), communication initialization signals (ComInit1, ComInit2), communication wake up signals (ComWake1, ComWake2), and the like. The status signals originated form the OOB signal detectors 267, 277, receiving phase lock loop locking ready signals (RxLocked1, RxLocked2), and the data signals stored in the elastic buffers 264, 274 may be encoded as the parallel receiving signals by means of the encoder 26, and then transmitted into the storage medium controller via a set of parallel signal receiving lines (RxData [9:0]).

For increasing the intensity of the detected signals, further adding receivers 266, 276 at the connection of each OOB signal detector with the respective signal lines is desirable. Additionally, strobe differential clocks TxStrobe1, TxStrobe2 are further received by the decoder 24 via one set of strobe differential lines as the basis of sample data, while strobe differential clocks Rxstrobe1, Rxstrobe2 are transmitted, by the encoder 26 via the other set of strobe differential lines, into the storage medium controller for sampling data.

The external physical layer 20 of the present invention further comprises selectors 269, 279, one input of each of which may be connected to serializers 243, 253, respectively, and the other input thereof may be connected to the receivers 265, 275, respectively, while the output thereof may be connected to the deserializers 263, 273 and the receiving phase locked loop 261, 271. The selectors may select, based on a loopback, a normal transmission/receiving path, or a loop transmitting the serial transmission data signals converted by the serializers 243, 253 to the deserializers 263, 273 for determining whether the encoding and decoding operation between the parallel signals and the serial signals in the system is correct or not. The circuit structure of the aforementioned serial external ATA physical layer may be integrated into a physical layer chip, for the direct installation on the main board, or for the installation in an interface card served for plug-in.

Figure 3:
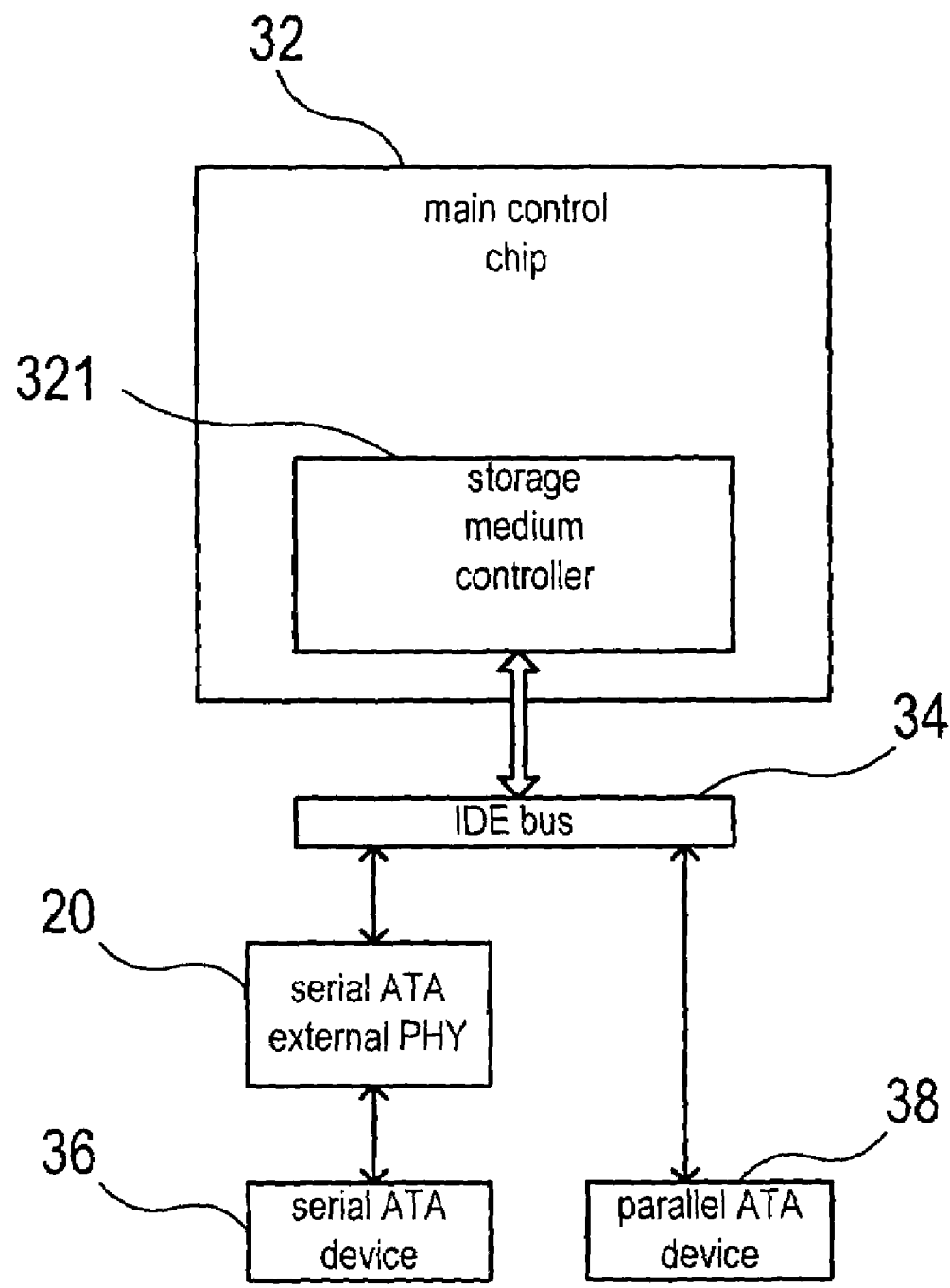
FIG. 3 is a configuration block diagram of the application of the present invention.

Next, referring to FIG. 3, a configuration block diagram of the application of the present invention is shown. As illustrated in the figure, with the external physical layer structure of the present invention, the number of pins required for the connection may be kept under 27 (Loop-Back pins are used for test without connecting to the storage medium controller), since the most part of the control signals and status signals, required for the physical layer 20 and for a storage medium controller 321 lying inside a main control chip 32, may be encoded into the data signals to be transmitted. Thus, only the pins on the main control chip connected to an IDE bus 34 are sufficient for the connection, without adding additional pins onto the main control chip 32. Also, it is possible for the installation of the serial external ATA physical layer 20 in an interface card in order to be plugged into the slots of the IDE bus 34, by which a serial ATA device 36 may be connected. As such, neither an increased manufacturing cost of the main control chip, nor the design change in the main board and main control chip being required is indeed beneficial to system designers.

Finally, referring to FIG. 4, a diagrammatical view of a signal encoding method according to a preferred embodiment of the present invention is shown. Currently, with the 8B/10B data conversion requirement used by the industry, the number of signal codes being defined is only 256, while 1024 codes are included in a common 10-bit signal. Thus, it is possible for defining the desired various control signals and various status signals using codes other than the conversion requirement of 8B/10B.

As illustrated in the figure, it is impossible for providing a data signal having six continuous bits with all 0's or all 1's. This characteristic may be used for providing six continuous bits with all 0's or all 1's as an identification symbol for the status signals and control signals, when the 8-bit parallel data signal of the parallel ATA is converted into the 10-bit parallel signal thereof. The identification symbol may be placed at the front end of the 10-bit parallel signal, and the code of the status signals, or control signals may be placed at the tail end thereof, such as EX1, for instance; the identification symbol may be placed at the tail end of the 10-bit parallel signal, and the code of the status signals of control signals may be placed at the front end thereof, such as EX2, for instance; or the identification symbol may be placed at the middle of the 10-bit parallel signal, and the code of the status signals as well as control signals may be placed at the front end and the tail end, respectively, such as EX3, for instance.

The codes undefined in the 8B/10B conversion requirement may be, of course, utilized flexibly. As such, a large amount of additional information may be encoded into the data signals to be transmitted by the signal lines of the data signals, in order for decreasing the interface signals required for the link between the physical layer and the storage medium controller to the minimum extent.

The aforementioned structure of the serial ATA external physical layer and the method of signal encoding can be used for simplifying the design and enhancing the efficiency of the external physical layer. Moreover, the number of connection pins required for connecting the serial ATA external physical layer with the storage medium controller can be also reduced significantly fewer than 27, such that only the original IDE bus is needed for connecting without adding any pins on the control chip. As such, not only the manufacturing cost may be reduced significantly, but also whether the added external physical layer chip or the additional interface card fashion being adopted may be determined by system designers upon considering whether the serial ATA is utilized, without any change in main board design.

To sum up, the present invention relates to a circuit structure and signal encoding method for a serial ATA external physical layer, particularly to a circuit structure and signal encoding method thereof capable of reducing the number of interface signals of a serial ATA external physical layer, essentially comprising encoding various control signals and various status signals into data signals using symbols other than a data conversion requirement of 8-bits and 10-bits by means of a decoder/encoder, in order for greatly reducing the number of interface signals required for the connection between the external physical layer and a main control chip. Therefore, this application is filed in accordance with the patent law duly, since the present invention is truly an invention with novelty, advancement or non-obviousness, and availability by the industry, thus naturally satisfying the requirements of patentability. Your favorable consideration will be appreciated.

The foregoing description is merely one embodiment of present invention and not considered as restrictive. All equivalent variations and modifications in shape, structure, feature, and spirit in accordance with the appended claims may be made without in any way from the scope of the invention.

The invention claimed is:

1. A circuit structure for a serial Advanced Technology Attachment (ATA) external physical layer comprising:
a decoder/encoder connected to a storage medium controller via a set of parallel signal transmission lines and a set of parallel signal receiving lines for decoding a parallel transmission signal originated from said storage medium controller into a parallel transmission data signal and at least one control signal;

at least one serializer/deserializer connected to said decoder/encoder for the conversion of said parallel transmission data signal into a serial transmission data signal;

at least one phase locked loop connected to said decoder/encoder and said at least one serializer/deserializer, respectively, for receiving said at least one control signal originated from said decoder/encoder, as well as generating clock signals required for the operation of said physical layer and transmitting a reference clock signal to said storage medium controller;

a plurality of transmitters, connected to said serializer/deserializer, each of said transmitters being used to transmit said serial transmission data signal to a serial ATA device connected thereto via a set of serial signal transmission lines;

a plurality of receivers connected to said serializer/deserializer, each of said receivers being used to transmit a serial receiving data signal received from said serial ATA device connected thereto to said serializer/deserializer, and then said serial receiving data signal being converted into a parallel receiving data signal by said serializer/deserializer for transmitting to said decoder/encoder; and at least one out of band (OOB) signal detector connected to receiving signal lines of said corresponding receivers, respectively, for detecting the operation condition of said serial ATA device and transmitting at least one set of detected status signals to said decoder/encoder, said parallel receiving data signal and said status signals then being encoded into a parallel receiving signal by said decoder/encoder and, afterward, transmitted to said storage medium controller via said set of parallel signal receiving lines.

2. The circuit structure according to claim 1, wherein said decoder/encoder comprises a decoder and an encoder, said decoder being connected to said storage medium controller via said set of parallel signal transmission lines, and said encoder being connected to said storage medium controller via said set of parallel signal receiving lines.

3. The circuit structure according to claim 1, wherein said serializer/deserializer comprises at least one serializer and at least one deserializer.

4. The circuit structure according to claim 3, wherein an elastic buffer is provided between said at least one deserializer and said decoder/encoder.

5. The circuit structure according to claim 3, further comprising at least one selector, one input of which being connected to said at least one serializer, the other input thereof being connected to at least one receiver, and an output thereof being connected to said at least one deserializer.

6. The circuit structure according to claim 1, wherein said at least one phase locked loop comprises at least one transmission phase locked loop and at least one receiving phase locked loop.

7. The circuit structure according to claim 1, wherein said at least one control signal comprises reset signals, power control signals, transmission valid signals, and one of the combinations thereof.

8. The circuit structure according to claim 7, wherein said at least one control signal further comprises control signals and receiving rate control signals.

9. The circuit structure according to claim 1, wherein said status signals comprise communication initialization signals, communication wake up signals; receiving squelch signals, receiving phase lock loop ready signals, and one of the combinations thereof.

10. The circuit structure according to claim 1, wherein said at least one phase locked loop has a function of transmission rate switching.

11. The circuit structure according to claim 1, further comprising a power controller for controlling the reset and other power states of said physical layer and connected said serial ATA device.

12. The circuit structure according to claim 1, wherein said circuit structure is capable of being integrated into a chip.

13. The circuit structure according to claim 1, wherein only one integrated drive electronics (IDE) bus is needed for connection between said physical layer and said storage medium controller.

* * * * *